R. S. NICHOL.
TRACTION WHEEL SCRAPER.
APPLICATION FILED NOV. 4, 1913.
1,156,248.
Patented Oct. 12, 1915.
2 SHEETS—SHEET 2.
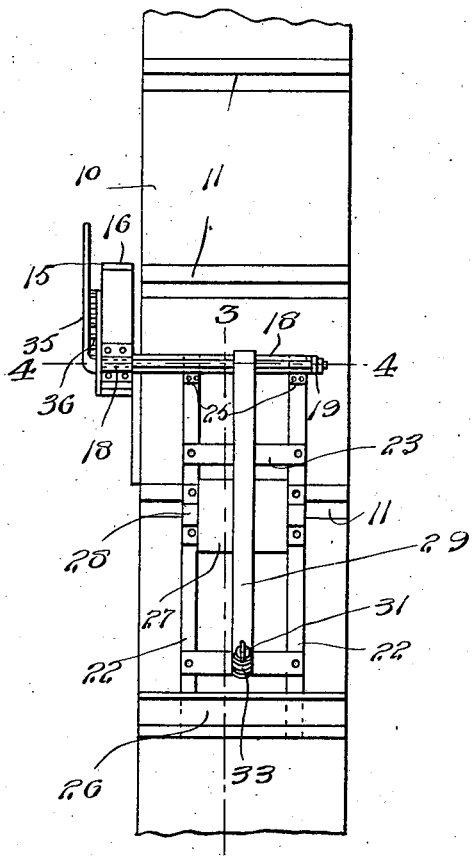
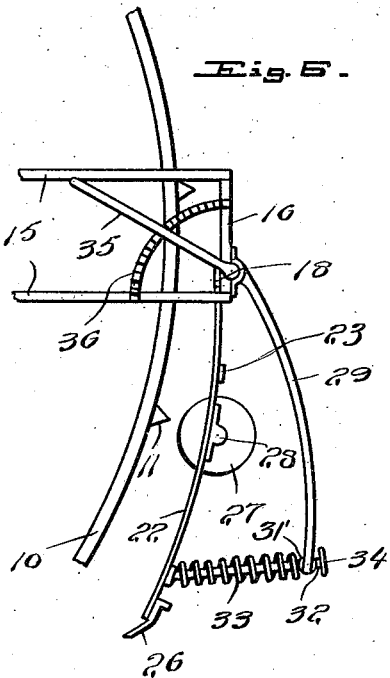
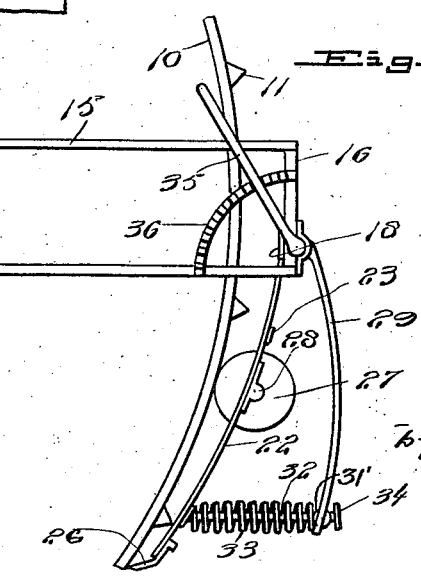
Witnesses
Chas. E. Kamper,
Francis Boyle
Inventor
R. S. Nichol,
by
Attorneys

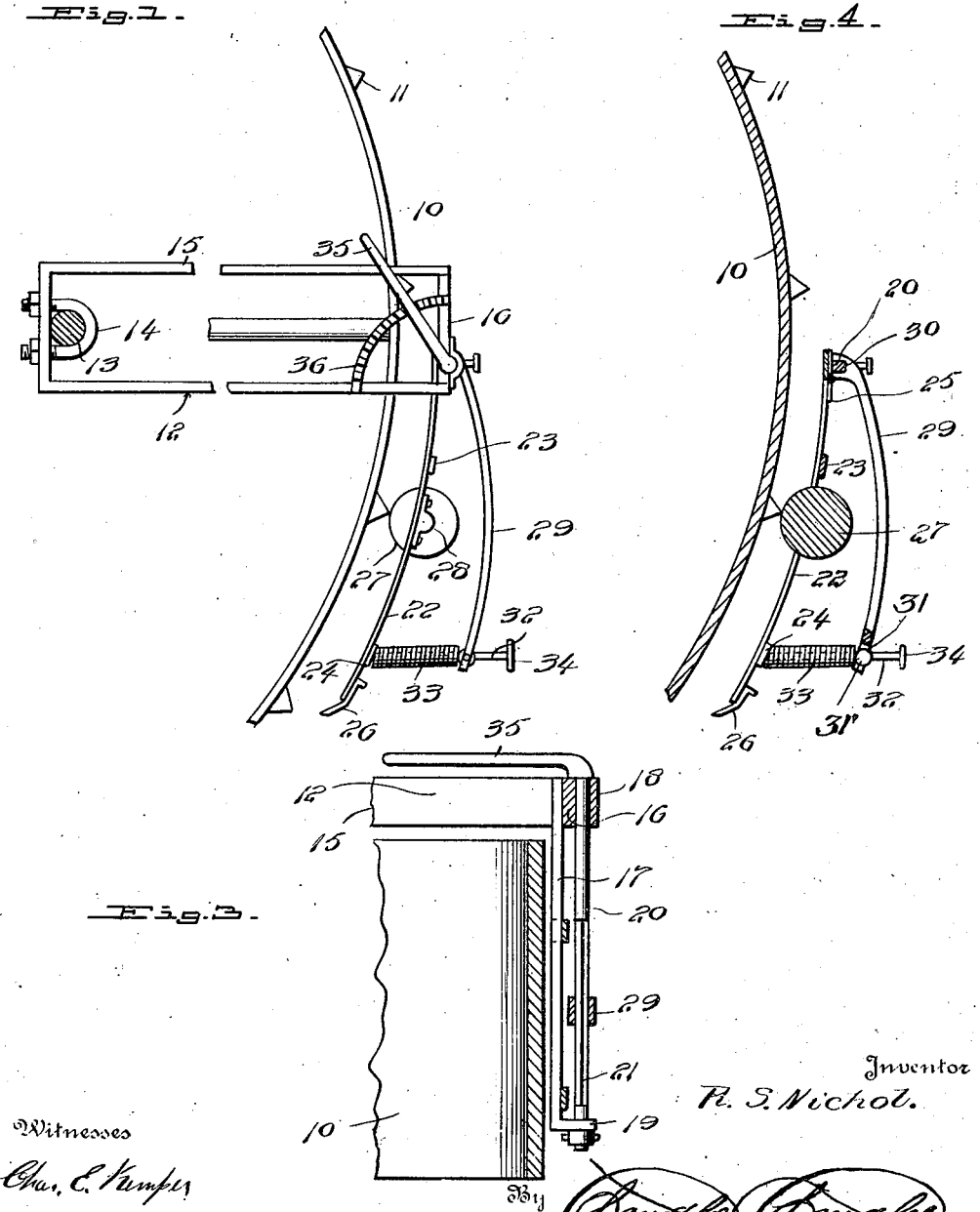

UNITED STATES PATENT OFFICE.

ROBERT S. NICHOL, OF BROOKING, SASKATCHEWAN, CANADA.

TRACTION-WHEEL SCRAPER.

1,156,248.  Specification of Letters Patent.  Patented Oct. 12, 1915.

Application filed November 4, 1913. Serial No. 799,235.

*To all whom it may concern:*

Be it known that I, ROBERT S. NICHOL, a subject of the King of Great Britain, residing at Brooking, in the Province of Saskatchewan, Dominion of Canada, have invented certain new and useful Improvements in Traction-Wheel Scrapers; and I do hereby declare the following to be a full, clear, and exact description of the invention, such as will enable others skilled in the art to which it appertains to make and use the same.

This invention relates to scrapers designed for use in freeing the treads of traction wheels from accumulations, and has for an object to provide a scraper that will effectively scrape accumulations from the cleats and from between the cleats of a traction wheel tread.

A further object is to provide an extremely strong scraper that may be conveniently operated when desired, there being novel means for facilitating the scraper rising over the cleats of the traction wheel tread without obstruction.

With the above objects in view the invention consists of certain novel details of construction and combination of parts hereinafter fully described and claimed, it being understood that various modifications may be made in the minor details of construction within the scope of the appended claim.

In the accompanying drawing illustrating this invention: Figure 1 is a side elevation of a traction wheel shown fragmentary, and equipped with my invention. Fig. 2 is a plan view of the parts shown in Fig. 1. Fig. 3 is a cross sectional view on the line 3—3 of Fig. 2. Fig. 4 is a longitudinal sectional view on the line 4—4 of Fig. 2. Fig. 5 is a fragmentary view in side elevation showing the scraper disposed to remove accumulations from between the cleats. Fig. 6 is a fragmentary side elevation showing the scraper raised to inoperative position.

Referring now to the drawing in which like characters of reference designate similar parts, 10 designates a traction wheel having cleats 11 on the tread.

In carrying out my invention I provide a horizontal frame 12 that may be rigidly secured to the wheel axle 13 as shown at 14, and includes sides 15 that are connected at the outer ends by a cross piece 16. Fixed to the inside of the cross piece is a rod 17 which extends out over the wheel tread, and mounted in a bearing 18 on the cross piece and in a bearing 19 on the rod is a shaft 20 which is provided with a central portion 21 of substantially square cross section. A pair of curved arms 22 are connected in rigid parallel relation by cross bars 23 and 24, these arms overhanging and extending longitudinally of the center of the tread, and being hinged at the rear ends as shown at 25 to the rod 17. The arms are equipped at the free ends with a scraper blade 26. A roller 27 is journaled in bearings 28 carried by the arms, this roller being designed to ride on the tread of the wheel and also to ride up over the cleats 11 whereby the blade may scrape the tread between the cleats and be lifted over the cleats by the roller, it being understood that the blade and roller are spaced apart a distance equal to the distance between adjacent cleats of the wheel. An upwardly curved arm 29 is provided at the lower end with a square opening 30 to receive the squared portion 21 of the shaft 20, the arm 29 having a notch 31 in its free end which receives a swivel pin 31′ through which passes a pin 32 that is secured at the lower end to the advance cross bar 24 above mentioned. A helical spring 33 is confined on this pin between the arm 29 and said cross bar whereby upon the arm 29 being rocked downwardly by actuation of the shaft 20 the spring will exert a yielding pressure upon the scraper sufficiently strong to hold the same in snug engagement with the wheel tread. There is a stop collar 34 secured on the end of the pin, which stop collar is engaged by the arm 29 when the latter is rocked rearwardly with a resultant raising of the scraper to inoperative position above the tread of the wheel. A crank handle 35 is secured to the end of the shaft 20 and is held stationary by engagement with a notched segment 36 carried by the frame 12 whereby upon the handle being released after the scraper has been rotated to operative position, the scraper will remain in this position, and conversely after the scraper has been rocked to inoperative position, the handle when released will be held stationary by the segment to maintain the scraper in this position.

In operation the scraper is normally disposed in inoperative position and when it is necessary to remove accumulations from the wheel tread, the operator rocks the handle 35 to position the scraper blade in engagement with the wheel tread. After the wheel has rotated under the scraper blade one or more times, all accumulations will have been removed from the tread, and the operator may now shift the handle back to initial position to raise the scraper to inoperative position.

What is claimed is:—

The combination with a traction wheel having cross cleats, of a pivotal scraper overhanging the tread of said wheel, said scraper including a blade adapted to contact with and remove accumulations from the wheel tread, a roller carried by said scraper and spaced from said blade at a distance substantially equal to the distance between adjacent cleats of said wheel, said roller riding upon the tread and riding over said cleats to position said blade in engagement with said cleats and lift said blade over said cleats, means for holding said scraper in operative position, and means for holding said scraper in released position.

In testimony whereof, I affix my signature, in the presence of two witnesses.

ROBERT S. NICHOL.

Witnesses:
SIM. JOHNSON,
M. LEWARTON.